Figure 1:
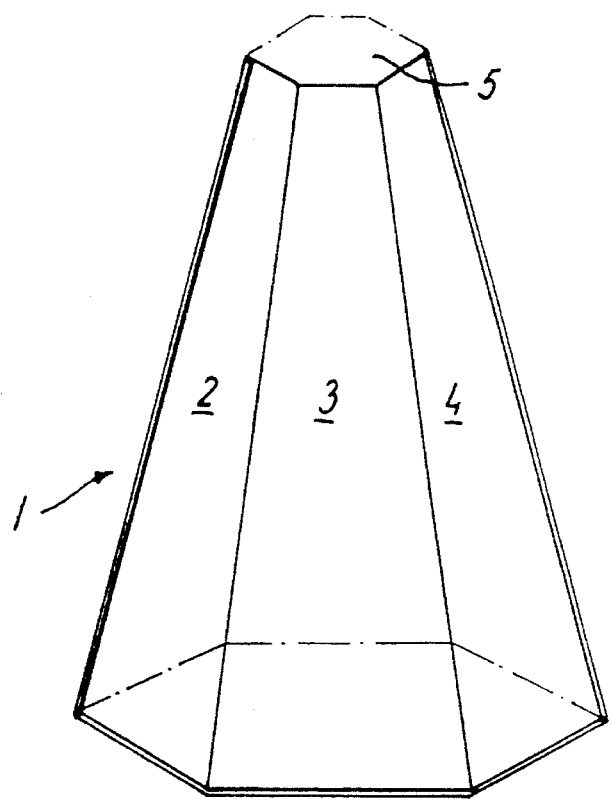

United States Patent [19]
Fredsby et al.

[11] Patent Number: 5,462,478
[45] Date of Patent: Oct. 31, 1995

[54] METHOD, MOULD, DEVICE AND APPARATUS FOR PROCESSING ROUNDFISH

[75] Inventors: Bent E. Fredsby; Erik C. Wormslev, both of Holte, Denmark

[73] Assignee: CDM - Quality Fish A/S/, Soborg, Denmark

[21] Appl. No.: 204,403

[22] PCT Filed: Aug. 21, 1992

[86] PCT No.: PCT/DK92/00247

§ 371 Date: Mar. 10, 1994

§ 102(e) Date: Mar. 10, 1994

[87] PCT Pub. No.: WO93/04589

PCT Pub. Date: Mar. 18, 1993

[30] Foreign Application Priority Data

Sep. 10, 1991 [DK] Denmark ................. 1590/91

[51] Int. Cl.⁶ ........................................ A22C 25/16
[52] U.S. Cl. ................. 452/135; 452/149; 452/161; 452/174
[58] Field of Search ................. 452/174, 108, 452/121, 157, 158, 161, 135, 179, 183, 149

[56] References Cited

U.S. PATENT DOCUMENTS

| | | | |
|---|---|---|---|
| 3,380,114 | 4/1968 | Härtl et al. ................. | 452/161 |
| 3,460,193 | 8/1969 | Yoshida ................. | 452/158 |
| 3,593,370 | 7/1971 | Lapeyre . | |
| 3,594,191 | 7/1971 | Lapeyre . | |
| 3,596,308 | 8/1971 | Kenney ................. | 452/161 |
| 3,800,363 | 4/1974 | Lapeyre . | |
| 4,037,294 | 7/1977 | Cowie et al. ................. | 452/161 |
| 4,363,251 | 12/1982 | Carlson . | |
| 4,365,387 | 12/1982 | Hartmann et al. ................. | 452/161 |
| 4,649,603 | 3/1987 | Bartels ................. | 452/157 |
| 4,748,724 | 6/1988 | Lapeyre et al. . | |
| 4,847,954 | 7/1989 | Lapeyre et al. . | |
| 4,908,703 | 3/1990 | Jensen et al. . | |
| 4,945,607 | 8/1990 | Akesson et al. ................. | 452/161 |
| 4,978,225 | 12/1990 | Reimer . | |
| 4,985,965 | 1/1991 | Leavitt ................. | 452/161 |

FOREIGN PATENT DOCUMENTS

| | | |
|---|---|---|
| 0128889 | 12/1984 | European Pat. Off. . |
| 2542577 | 9/1984 | France . |
| 217978 | 1/1985 | Germany . |
| 257009 | 6/1988 | Germany . |
| 59-216538 | 12/1984 | Japan . |
| 64-55138 | 3/1989 | Japan . |
| 96729 | 6/1949 | New Zealand . |
| 110210 | 12/1954 | New Zealand . |
| 124572 | 9/1960 | New Zealand . |
| 169371 | 1/1976 | New Zealand . |
| WO8912397 | 12/1899 | WIPO . |
| WO8803645 | 5/1988 | WIPO . |
| WO9004782 | 5/1990 | WIPO . |

*Primary Examiner*—Willis Little
*Attorney, Agent, or Firm*—Sughrue, Mion, Zinn, Macpeak & Seas

[57] ABSTRACT

Frozen roundfish, such as codlike white fish, salmon or trout, having a substantially straight shape is longitudinally split centrally of the fish so that the main portion of the vertebral column is removed, and each of the frozen fish halves are subsequently cleaned and searched for impurities, following which the still frozen fish pieces are portion-packed and freeze-stored. With the view of positioning the fish during the splitting it may be frozen in a faceted shape or with raised fins. When the whole, frozen fish body has been positioned with its vertical plane of symmetry in a well-known position, the fish may be securely held by means of fixing means (59) having a part (68) consisting of a fluidum absorbing and flexible material that may be locked in abutment on the exterior of the frozen fish and freeze firmly thereto. The grip of the fixing means in the fish is so strong that it will not be broken by the splitting of the fish.

22 Claims, 7 Drawing Sheets

METHOD, MOULD, DEVICE AND APPARATUS FOR PROCESSING ROUNDFISH

The invention relates to a method of processing roundfish having an individual weight as caught averaging from 0.3 to 10 kilos, for portion packed frozen pieces of fish, where the fish after catch is frozen onboard the fishing boat.

Roundfish are to be interpreted for instance as codfish, Atlantic catfish, coalfish, haddock, whiting, hake, molusus, macherel, hokai, pollock, salmon, sea trout, redfish and wolffish. Such fish constitute the major quantity of fish caught with a view to sale as consumer fish.

The large sale volume and consumption of consumer fish are to be found on the continental markets in Europe, U.S.A. and Asia, i.e. geographically remote from the sea areas where the major quantity of consumer fish are caught, entailing that a large part of the sale on said markets takes place in the form of frozen, portion packed fish.

The quality of consumer fish is extremely dependent on the manner of storing and the time elapsing from the catch. Iced fish generally preserves a fine quality for two to three days after catch, but after 12 to 14 days iced fish are no longer usable as consumer fish. If the fish is frozen within the first 24 hours after catch a high quality may normally be preserved for several months.

The fishing for codlike consumer fish is presently divided into three main groups:

A) Coastal fishing where small and large fishing boats land the fish the same day as caught with the view of selling the fish as high quality fresh food in the region of landing the catch.

B) The local/regional high sea fishing where medium-sized and large fishing boats remain on the fishing ground until the vessel is full-loaded or the limit of keeping the first caught fish has been attained. Due to the extensive fishing period the landed fish will be at least from 1 to 12 days old. The catch is sold for fresh food consumption or for processing in the landbased fish industry.

The fish industry located in the proximity of the continental markets has difficulty in procuring sufficient supply of high-quality fish because the freshest part of the high-sea catch is distributed by cold storage car on the continental market where the fish is sold as fresh food. This fish industry therefore only disposes of either iced fish that is from 6 to 12 days old and therefore is of a medium to low quality, or of fish frozen on sea and thawn, processed into a finished product and refrozen in factory. However, the quality of the finished product suffers from the circumstance that the fish is frozen twice with an intermediary thawing, meaning that the continental fish industry has difficulty in competing as to product quality with the industry e.g. in the Faroe Islands, in Iceland or in Northern Norway, the fish industry having there free access to fresh fish because the demand on the consumer market for fresh fish is there substantially smaller than the landed quantity of fish.

C) The more distant high-sea fishery where big factory ships catch the fish which immediately after the catch is processed into a commodity in the form of portion packed fish pieces and is frozen onboard a vessel which results in a finished product of a very high quality, saleable at prices that are from 20% to 25% higher than a corresponding frozen product processed from fish that are a little older or thawn and refrozen. The flexibility of the factory vessels is, however, very poor, since the space, movement and weight conditions onboard necessitate very simple processing lines requiring setting for a specific species of fish and also a specifically approximate size of fish. The failing flexibility entails that all the part of the catch which does not correspond to the settings of the processing line is thrown overboard. In view of the fact that the cooling capacity as well as the number of the crew are limited the miscut and damaged fish together with less valuable parts of the fish are thrown overboard again. On factory ships it is not unusual that the yield of the finished product corresponds to 10 to 15% by weight of the catch.

Quite apart from the problem involved for the continental fish industry, and mentioned under item B), in procuring sufficiently fresh raw materials, the fish industry generally suffers from three well known problems. Firstly, the utilization of the capacity is low because the industry in order to uphold the quality of the finished product, has to process the fish immediately after it has been landed, and since the fishery is dependent on weather, wind and season and on catch quota fixed by law, there are considerable variations in the landed quantities and species of fish and thus in the load of work in industry. Secondly, the fish resources in seas are limited which is inter alia reflected by the catch quota and, thirdly, the working conditions in fish industry are stressing because the processing is effected as a wet process with a vast consumption of water and because the operating crew become physically worn-down by doing repeating, uniform movements at a rapid pace.

It has been known for many years to process tuna in a frozen condition. Tuna is a very big fish having an individual weight of up to 500 kilos and inter alia due to its size the tuna is handleable in the mechanical processing. Compared to cod fish, the tuna has a very small amount of bones in relation to the amount of meat, thereby making it possible to cut away the bones without having an inacceptably large meat loss. From U.S. Pat. No. 3,594,191 issued in 1969 it is known to cut out the frozen tuna into many slices of equal thickness. Since the slices are defined by two parallel cuts it is possible to effect the further processing by merely placing the slices on a plane base and routing them through a processing station at which the backbone and the blood sidemeat are cut away, e.g. as shown in U.S. Pat. No. 4,748,724, following which the edible meat is cooked, sliced and canned.

FR-A-2,542,577 deals with a circular saw having a diameter of approximately 1 m for dividing a whole frozen tuna into smaller pieces that are handleable in the following processing of the tuna. The tuna is routed on a conveyor belt and may for instance be separated longitudinally by a cut perpendicular to the vertical plane of symmetry of the fish.

DD-A-217,978 describes an apparatus for intersecting a frozen fish block by means of water Jets, i.e. a boneless product prepared by block-frozen fillets of fish so that the fish block may be divided into slices which for instance form part of ready-prepared dishes.

DD-A-257,009 deals with a roundtable with a centrally positioned robot arm for the control of a water jet cutter head for cutting fresh fish kept firmly to the roundtable by means of vacuum or freezing.

It is the object of the invention to provide a method that eliminates the above mentioned problems of the fish industry in the processing of roundfish and that allows the production of high-quality portion packed frozen pieces of fish, irrespective of the geographical location of the fish industry and of the variations of the landed amounts of catch. It is a further purpose to offer a high degree of utilization of the caught fish.

With this in view the above mentioned method is characterized in that frozen fish having a substantially straight shape is longitudinally split centrally of the fish and the main portion of the vertebral column is removed by making at least one cut substantially parallel to the vertical plane of symmetry of the fish, in that the cut face in either of the frozen fish halves is searched for localizing impurities such as bone remains, pin bones or black membrane, in that at least part of the localized impurities is removed from the frozen fish meat and in that the cleaned, frozen pieces of fish are portion packed and freeze-stored.

It is a feature of the invention that the fish may be longitudinally severed without separating the fish by means of transverse cuts through the fish body prior to the splitting, such cuts inevitably diminishing the size of the ready processed fish pieces and thus result in loss of edible fish meat. For practical reasons the head is, however, frequently cut off prior to severing the fish body because the head components may then be removed by a single cut.

By splitting the frozen roundfish in the above mentioned manner and cleaning the meat determined for consumption of the still frozen fish halves of unwanted impurities, frozen, boneless fish fillets or fish cuttings, such as pieces of loin, block, center or tail, may be prepared in a frozen ready-product quality corresponding to the ready-product produced by the factory ships mentioned under item C) where the fish is processed in fresh condition prior to freezing, and since the processing is carried out ashore the previously known high percentage of spillage of the catch may be eliminated by processing mainly the whole fish, because the frozen fish may be sorted as to species and size prior to the processing and the processing equipments may be designed to be extremely flexible.

In view of the fact that the fish is individually frozen onboard the fishing boat irrespective of the species and size of the fish, all catch may be landed, even in a quality corresponding to the day-fresh fish landed by the vessels referenced under item A).

The apparatus for freezing whole fish does not require much space and it may therefore be installed in medium and large sized vessels as mentioned under item B) which land by far the major quantity of the consumer roundfish. Owing to the freezing the landed fish has a uniform, very fine quality and the fishing boat may further remain on the fishing ground until full cargo, because it is no longer needed to go into harbour before the first caught fish gets too old.

The fish is landed and completely processed in frozen condition, thereby allowing the fish without loss of quality to be conveyed over longer distances to the fish industry and be stored there prior to the finishing processing. The fish industry thus obtains, on one hand, free access to purchase raw materials from remote landing places and, on the other hand, the possibility of processing the fish in step with orders coming in instead of according to the supply of raw material, and it will further be possible to obtain a uniform and full utilization of capacity in the individual factory. The invention also makes it possible to allow the processing to be effected as a high-automatized process only requiring a small number of operating persons and being thus appropriate for working in three shifts.

In a preferred further development of the method according to the invention the amount of consumer meat cut away by splitting the fish has been minimized in that the splitting cut is effected longitudinally through the fish in such a manner, that the spinous pegs of the vertebral column are cut away from the fish meat but that a transversely outer segment of the vertebra segments is left in the frozen fish meat and in that the vertebra segments by the following searching are localized in the fish meat and removed therefrom, preferably by milling. The narrow splitting cut ensures that only a small part of the consumer meat is lost which is of great importance for the economy in the processing of roundfish containing a comparatively large amount of bones compared to the amount of meat.

By the freezing of fish onboard the fishing boat it may be taken into consideration how the subsequent processing is being carried out, the manner of freezing being decisive of how to position the fish prior to affecting the splitting cut. Popularly spoken, the manner of freezing and the manner of positioning are mutually correlated in the same way as key and lock.

When the caught fish is frozen with the view of processing according to the above mentioned method, this may according to the invention appropriately be effected in that the fish after catch and ventral cleaning are individually held and formed so that the fish has a substantially straight shape, and that its exterior shows at least two well-defined plane areas, preferably opposite each other on either side of the fish and extending across a substantial part of the length of the fish, and that the fish is held in this shape until at least the outer layer of the fish is frozen. The well-defined plane areas serve to guide and position the fish while being processed so that the vertical plane of symmetry of the fish may be oriented in relation to the incision producing cutter means, such as a saw. The plane areas may be provided in that the fish during freezing is kept firmly in a mould having at least two plane, longitudinal lateral faces with a length corresponding to a considerable portion of the length of the fish body, where the width of the lateral faces declines from the one end to the other, and wherein the internal clearance of the mould transversely to the plane, lateral faces is smaller than the anatomically natural width in the same direction of the fish inserted in the mould. Upon introducing the fish into the mould its curved lateral faces will be deformed into a plane shape of the plane lateral faces of the mould.

According to an alternative method according to the invention the fish may be frozen in that it is suspended at the tail after catch and ventral cleaning, that the fins of the fish are raised and that the fish is subsequently flushed with coolant, such as brine, until the raised fins and at least the outer layer of the fish is frozen, following which the whole fish is subjected to freezing while maintaining the substantially straight shape obtained by the suspension at the tail.

Experiments have shown it expedient to sever the fish by means of a saw whose cut at least cuts away the spinous pegs of the vertebral column. Prior to laying the cut the saw and the fish must be positioned in relation to each other so that the saw may bisect longitudinally through the fish substantially parallel to its plane of symmetry. The invention delineates three different methods of this positioning of the fish.

The first method builds on the recognition that the fins of the fish are positioned in the desired plane of symmetry. This method is inter alia characterized in that at least two fins of the frozen fish are cut away so that the fin rays positioned in the fish meat occur in the cut, that the position of the fin rays is detected and the vertical plane of symmetry is determined from the positions of the fin rays.

The second method of positioning the fish is used in connection with fish which during the initial freezing is formed with an exterior having at least two well-defined plane areas as explained above. In this method the plane areas are used to place the fish in a position with a well known position of its vertical plane of symmetry.

The third and preferred method is practised in connection with fish frozen with raised fins as described above. The raised fins are here used to position the fish in the desired position which may be effected in a simple manner because the fins are positioned in the plane of symmetry.

The invention further relates to a device for use in positioning the fish according to the last mentioned method. The device is characterized by having a lower part and an upper part having each a longitudinal slot guide opposite each other, said slot guide having a length at least of the same size as the fish body and a depth larger than the height of the raised fins, and in that the upper part is movable in relation to the lower part in such a manner that the guide slots in the two parts still remain substantially in the same plane. The fish may in an extremely simple manner be positioned within the device by pulling it with the tail in front in between the lower and upper part in such a manner that the fins slide as a slide member into the slot guides acting as guideways, thereby entailing that the vertical plane of symmetry of the fish be made to flush with the slot guides opposite each other. The movability of the upper part in the plane of the guide slot ensures that the upper part may be moved away from the lower part in step with pulling the fish in between the two parts.

With the view of facilitating the insertion of the fish into the device, this is appropriately shaped so that the lower part and the slot therein are considerably longer than the upper part, that each of the slot guides in the lower and upper part discharges into a wedge-shaped infeed opening at one end of the slot guide, and that the underside of the upper part is bevelled at the infeed end. While one fish is being processed another fish may be positioned with the fins in engagement with the guide slot in the protruding portion of the lower part. When the fish is fed in beneath the upper part, the upwards facing part of the narrow tail end of the fish body will meet the bevelled underside of the upper part so that the upper part by itself is lifted in step with pulling the fish in between the parts. The wedge-shaped infeed openings facilitate the insertion of the fins in the slot guides.

It is important to be able to firmly hold the frozen fish in a secure and precise manner during the splitting proper, the fish being influenced when splitting with a saw both by vibrations and by a force in the cutting direction of the saw. With the view of obtaining a simple and safe securing of the fish while being processed, the invention discloses a device being characterized in that it comprises a number of fixing means to be locked in abutment on the exterior of the frozen fish, and that the part of each fixing means determined to abut on the exterior of the fish includes an absorbent and flexible material, preferably of a porous synthetic material, such as nylon fiber material, foam rubber or polyurethane foam. Before the fixing means are made to abut on the frozen fish the flexible material is wetted with a liquid which upon abutment on the fish will freeze thereto. It has turned out that with such a device an extremely good fastening of the fish is obtained. When the flexible material is made to abut on the exterior of the fish it assumes the shape of its contour so that the seize area becomes large. It has further turned out that the trip of the material on the fish is unaffected by vibrations, presumably because the vibrations are absorbed by the flexible material.

A structurally very simple design of this device is characterized in that it has two holders, each carrying a number, preferably at least three, fixing means distributed over a length corresponding to the length of the fish body, and in that the holders are situated on either side of a fish positioning device and are so pivotally journalled that the holders are rotatable through an angle of substantially 90° between a position in which the flexible material of the fixing means may abut on the sides of a fish disposed in the positioning device, and a position in which the surface of the flexible material determined to abut on the fish body faces upwards. With said design of the holder device the fish only needs to be retained in the positioning device until the holders have been swung up into the position in which each of the fixing means seizes a respective side of the fish and retains it. The fish fastened in the holder device may then be routed through the various processing steps. After the fish is split the two holders may be rotated to their respective side so that the cut face of either fish half is made to face upwards. In this position the cut faces are exposed and easily accessible for the following inspection for and cleaning away of the undesired impurities.

The above mentioned devices and methods may in appropriate combinations be put to use in an apparatus for carrying out the method according to claim 1 or 2, said apparatus being characterized by the features claimed in claim 13. This apparatus makes an automatized processing of the fish possible and thereby replaces the previously known manual handling which exerted a physically wearing-down effect on the operating staff. The processing according to the invention further provides for obtaining the important advantage that the water consumption of the fish industry and thus the load of waste water are reduced, the processing in the apparatus according to the invention being carried out as a dry process.

Figure 2:
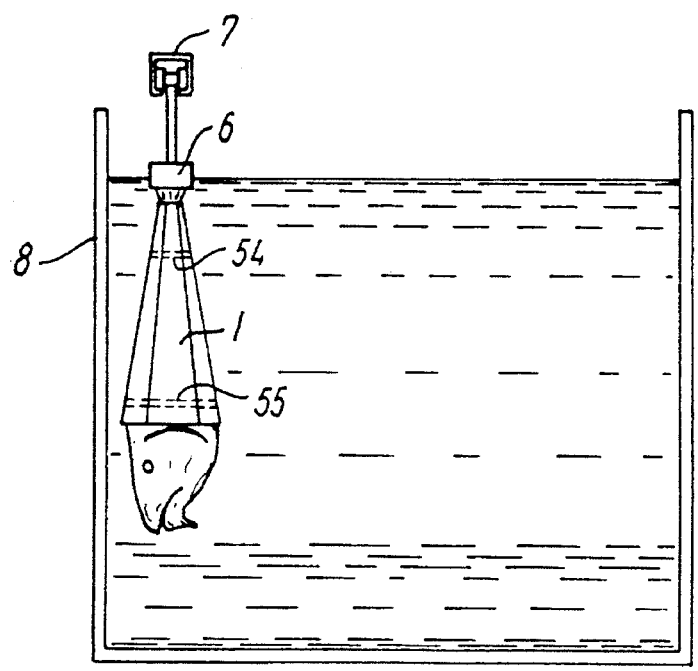
Figure 3:
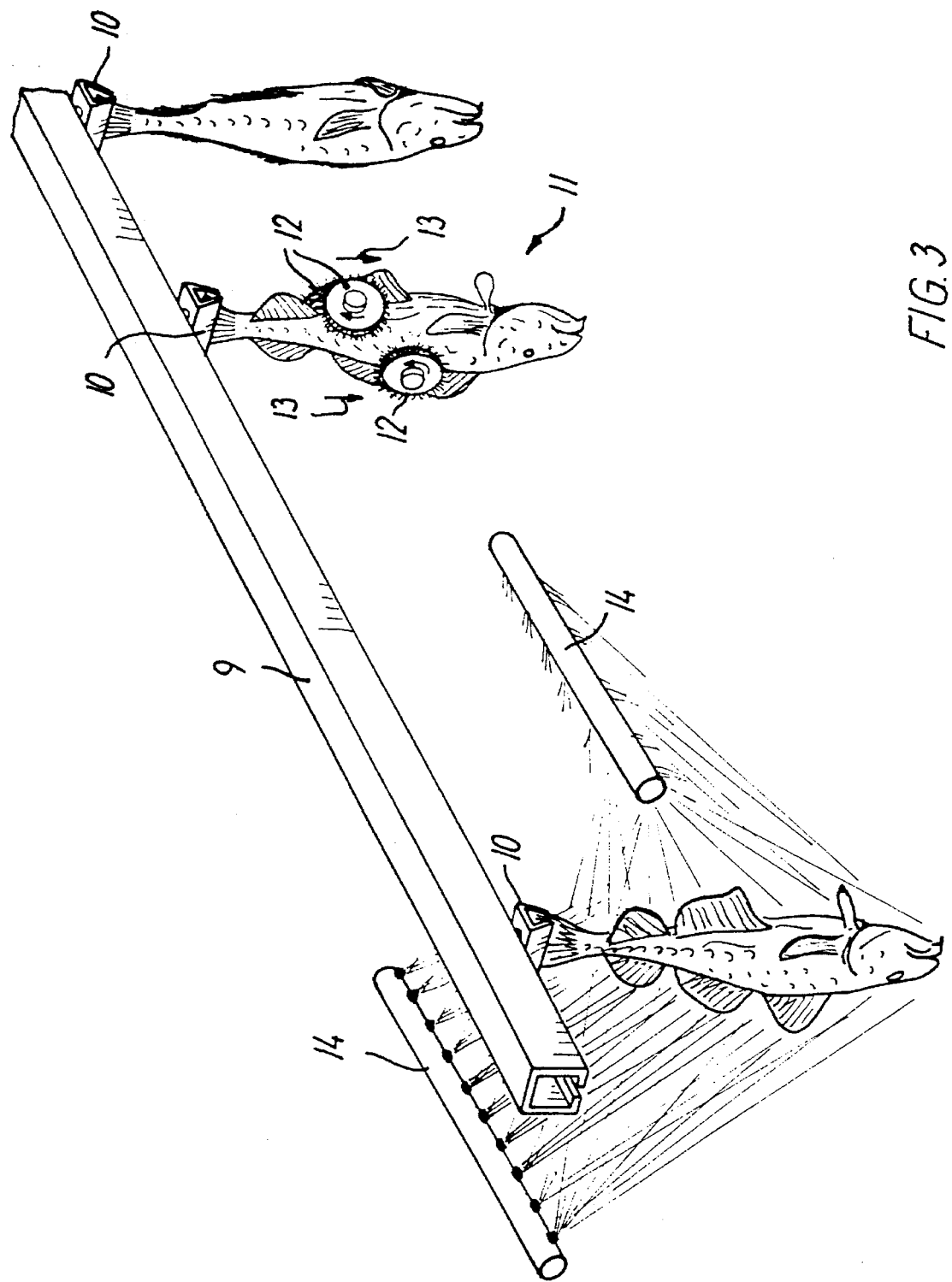
Figure 4:
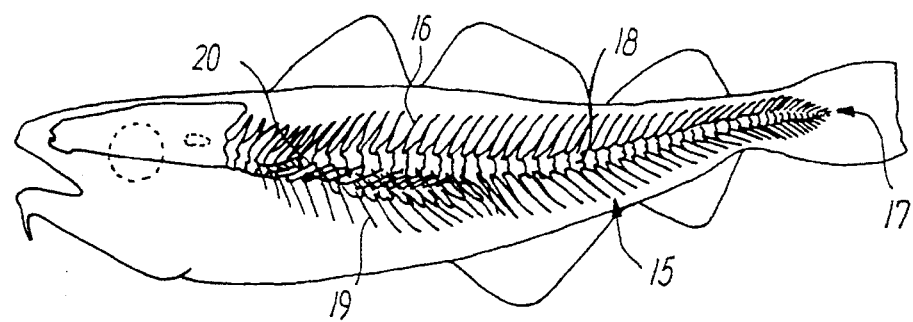
Figure 5:
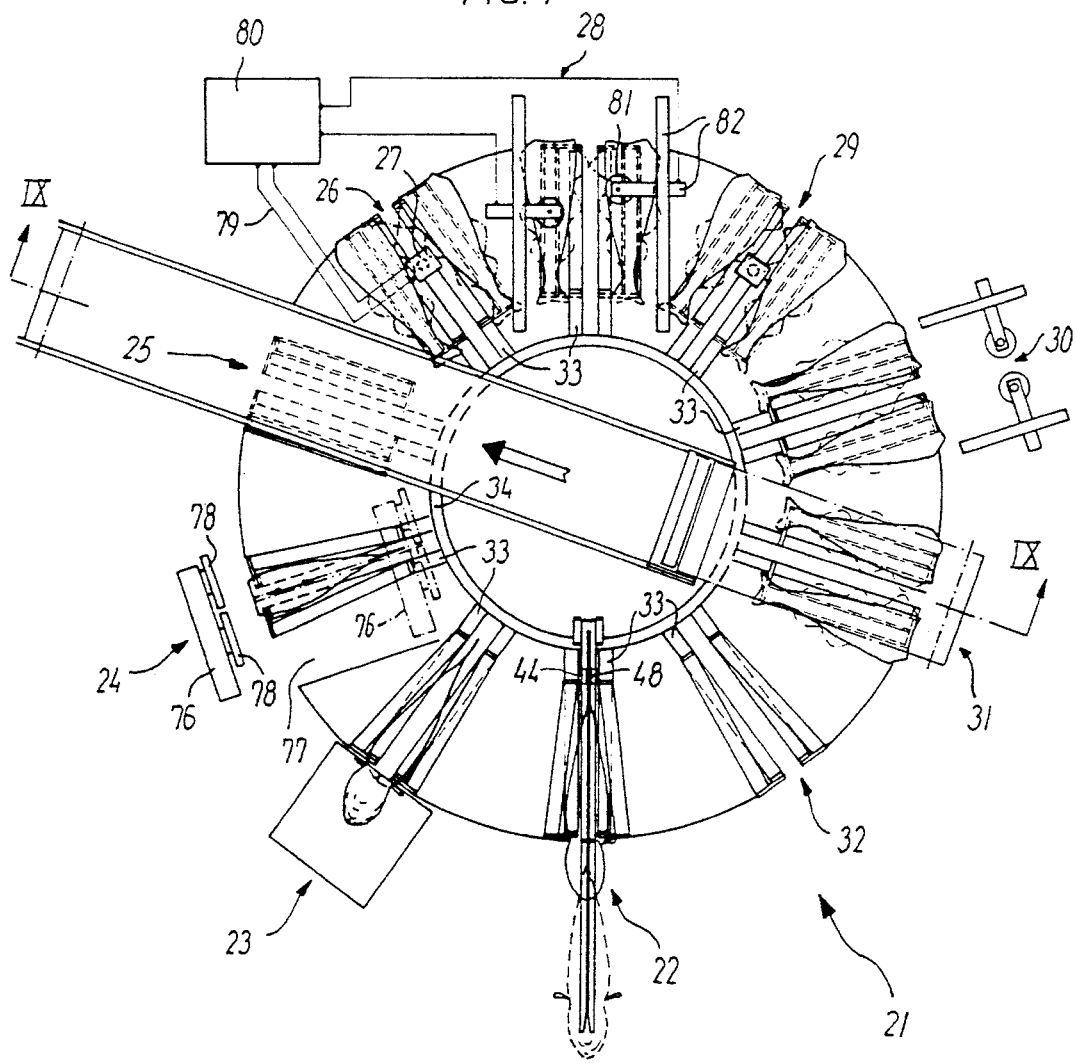
Figure 6:
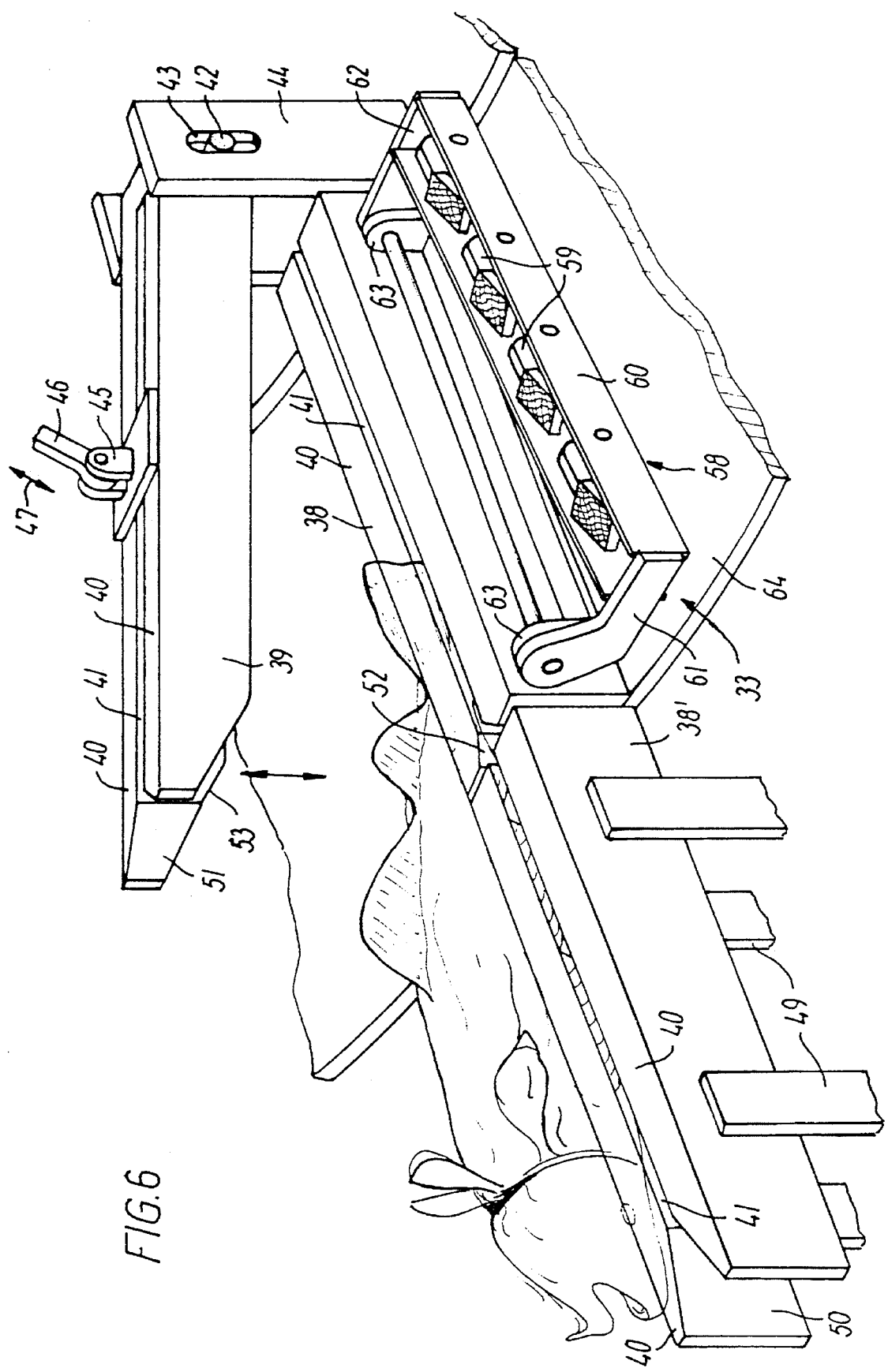
Figure 7:
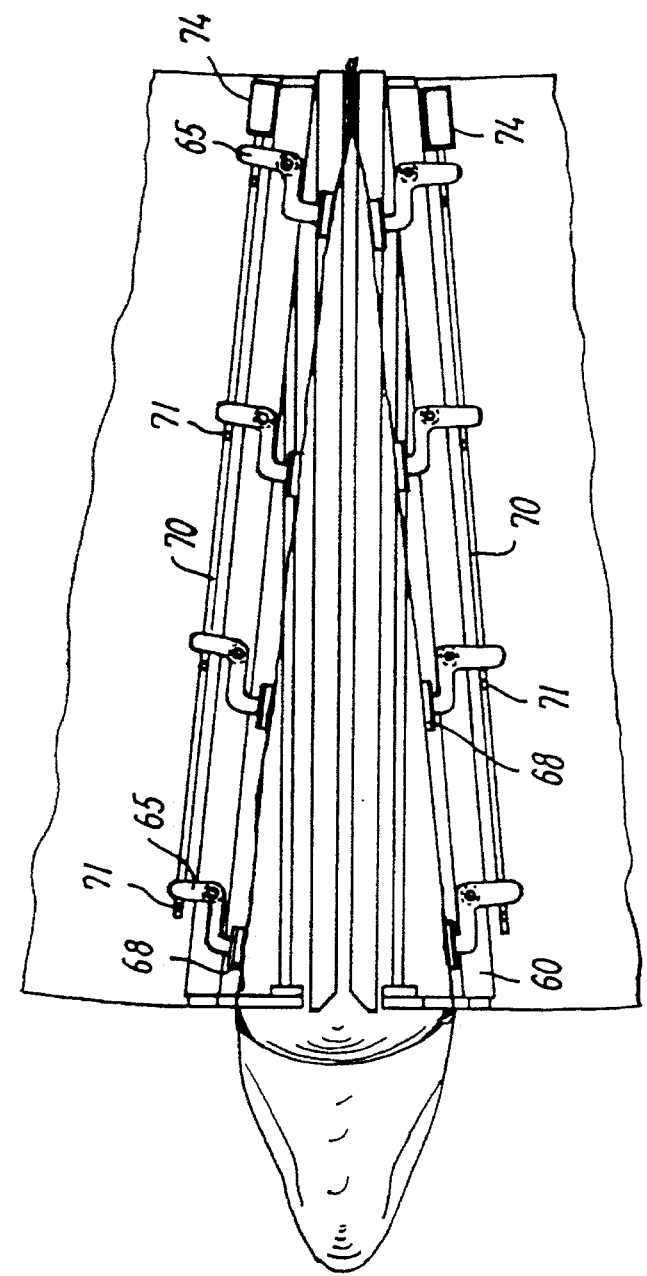
Figure 8:
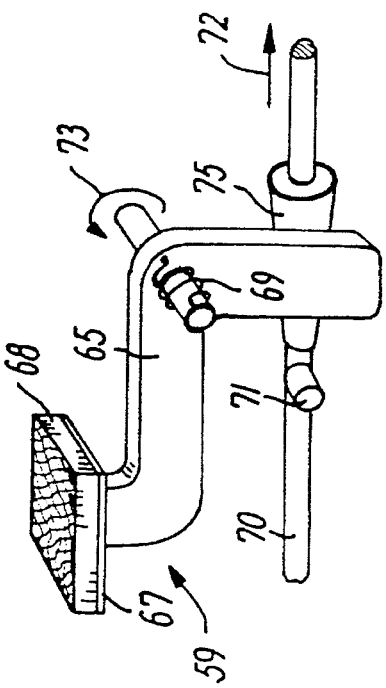
Figure 10:
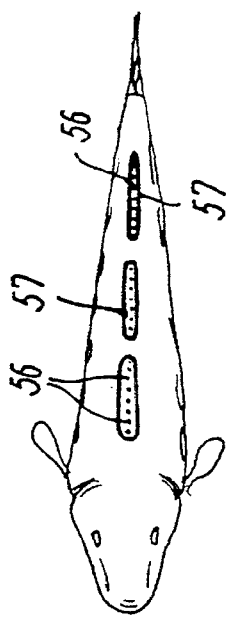
Figure 11:
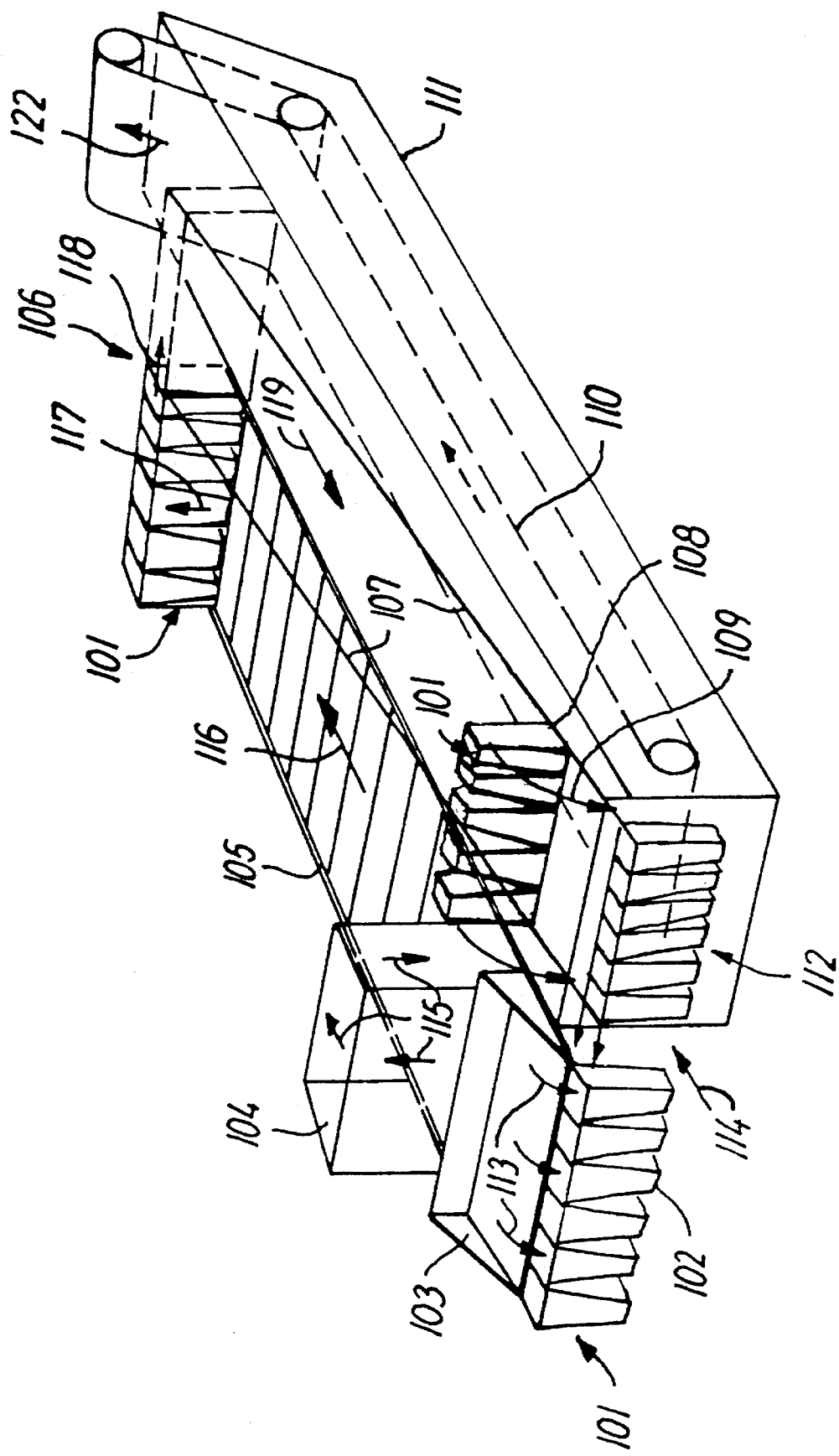

Examples of embodiments of the invention will now be described in more detail with reference to the schemtical drawings, in which FIGS. 1 and 2 illustrate a mould for use in the faceted freezing of fish, FIG. 3 depicts an apparatus for freezing fish with raised fins, FIG. 4 is a side elevation of a codfish and showing the position of the bones, FIG. 5 is a plane view of an apparatus for the processing of frozen fish, FIG. 6 is a perspective view of a preferred embodiment of a device for the positioning of fish with raised fins and a device for securely holding the fish, FIG. 7 is a simplified plane view of the holder device, FIG. 8 depicts on a larger scale a perspective view of a fixing means from the holder device, FIG. 9 a section along the line A—A in FIG. 5, FIG. 10 is an illustration of a codfish, viewed from above, the dorsal fins being cut away, and FIG. 11 illustrates a perspevtive view of an apparatus for the faceted freezing of fish.

The high quality of freshly caught fish may be preserved by freezing the fish immediately after catch. It is an aspect of the invention that the fish is frozen in a substantially straight shape, so that in frozen state it may be completely processed into portionwise packed frozen pieces of fish. The interpretation of the expression substantially straight shape is that the backbone of the fish is in one plane or that the backbone only curves so faintly that a saw may lay a cut along the backbone. As illustrated in FIGS. 2 and 3 the fish may be frozen in a straight shape by being suspended at the tail during the preliminary freezing.

It is possible already at the stage of freezing to take into consideration how the further processing of the fish is to be effected, in particular how to position the fish with a well known positioning of its vertical plane of symmetry.

FIG. 1 shows one half of a mould 1 having three inwards facing pairs of opposite lateral faces 2, 3 and 4 the width of which declines so from one end to the other end of the mould that this is funnel-shaped with a tapering corresponding to the tapering of the fish body from the head to the tail end. The distance between the edges that are positioned remotest from each other of the lateral faces 2 and 4 corresponds to the height of the fish whereas the distance between the pair of lateral faces 3 is a little shorter than the width of the fish. When the fish is inserted in the mould its curved exterior becomes deformed by the lateral faces 2, 3 and 4 so that elongated, plane areas on the fish occur. As the fish is oval it will by itself be oriented so in the mould that the lateral faces 3 are parallel to its vertical plane of symmetry. At its narrow end the mould has an opening 5 allowing passage of the fish tail which, as illustrated in FIG. 2, may be fastened between the jaws of a tail clamp 6 suspended in a conveyor 7 in such a manner that the fish suspended at its tail may be passed through a vessel 8 with coolant, such as NaCl-brine that may have a temperature of −18° C.

The mould 1 is advantageously made from bent thin sheet metal with such a small wall thickness that the heat from the fish is rapidly drained to the coolant in vessel 8.

In the embodiment shown in FIG. 2 the length of the mould and of the fish body corresponds by and large to each other. The mould may of course be substantially longer than the fish which allows to use one and the same mould for many different fish sizes.

The mould may as well be provided with longitudinal slits which allow the fins of the fish to protrude from the mould so that they do not by the freezing entail that areas around the fins of the fish body get deformed.

As an alternative to tail suspension of the fish the mould may be composed of two halves divided along the longitudinal plane of symmetry of the mould and which may be locked around the fish and capture it. The external side of the mould halves may be secured to pivotal arms guiding and supporting the mould under the seizing movement and the subsequent movement through a vessel with coolant or suspension in a cold storage.

FIG. 3 is a sketch of an apparatus for freezing the fish with raised fins. An endless conveyor 9 carries a large number of tail clamps 10 in which the fish in an infeed station is seized at the tail. In a following station 11 the fins of the fish are raised by means of two pairs of counter-rotating rollers 12 of which only one roller of either pair is shown for the sake of clearness. The rollers of each pair are journalled so that they are spring-biassed for movement towards each other so that after they have been made to abut on the sides of the fish, they follow the contour of the fish and grasp and raise the fins when the pairs of rollers are moved in the direction of the arrow 13. The rollers may be vertically oriented but it is preferred, as shown in FIG. 3, that their longitudinal axis is by and large horizontal and that the rollers of each pair form an acute angle with each other so that the fins project in the direction towards the angle apex and are brushed to an upright position upon moving the rollers from the tail end of the fish to its head end.

The fins may alternatively be raised in that the conveyor has a path section in which the fish are positioned with their longitudinal axis oriented in the horizontal direction and in which the conveyor pulls the fish horizontally forwards simultaneously with the fins projecting into one or more slots whose side walls are provided with teeth grasping the fins and raising them.

Immediately after raising the fins the conveyor 9 moves the fish in between two spraying pipes 14 flushing the fish with coolant, such as NaCl$_2$-brine at a temperature of −18° C. The spraying pipes extend in parallel with the conveyor and have a length ensuring that the fins of the fish and the outer layer of the body are frozen when the fish has passed the spraying pipes. When the fish body has been frozen to such a depth that the fish is dimensionally stable even though it is not longer suspended at its tail, the fish may be released from the tail clamp whereafter the further freezing may occur in a refrigerating chamber or in a brine bath.

The frozen fish may then be glazed, landed and conveyed in a frozen state to a factory for further processing.

In order to facilitate the understanding of the following description of the processing of the fish the bone structure in a codlike white fish is illustrated in FIG. 4. The vertebral column 15 (Columna Vertebralis) is positioned in the vertical plane of symmetry of the fish and includes the spinous pegs 16 extending from the vertebrae 18 of the spine 17. Ribs (Costae) and pin bones 20 (Epipleuralis) extend from the part of the spine positioned adjacent the ventral cavity, said ribs and pin bones extending substantially transversely to the vertical plane of symmetry. By the fish processing at least the vertebral column 15 and possibly also the ribs 19 and the pin bones 20 should be removed from the fish meat determined for consumption.

FIG. 5 shows an apparatus in the form of a roundtable 21 for the processing of the frozen fish. The roundtable includes the following consecutive processing stations:

a first station 22 at which the fish is fed in and fixed in the apparatus, as described below, a head cutter station 23 at which the head of the fish in a manner not shown is cut off the body, a second station 24 at which the fish is split longitudinally by laying a cut with a saw through the fish parallel to its vertical plane of symmetry, a third station 25 at which the two fish halves are oriented with the cut facing up, a fourth station 26 at which a detector in the form of a video camera 27 scans the fish meat in order to localize undesired impurities, a fifth station 28 at which undesired impurities are removed, a supplementary detector station 29 for rechecking the cleaning, a further cleaning station 30 at which possible remaining, undesired impurities are removed, a sixth station 31 at which the cleaned fish halves are released from the holder device, and a seventh station 32 at which the holder device is cleaned and made ready to receive the next fish.

The roundtable 21 is provided with a number of holder devices 33 corresponding to the number of processing stations. As indicated in FIGS. 5 and 9, the holder devices 33 are rigidly connected with and carried by a horzontally positioned ring 34 supported by a number of carrying wheels 35 running in an upwards facing annular guide groove 36 in a frame 37 standing on the floor. The ring 34 may by means of a driving motor, not shown, be rotated indexingly so that the holder devices are moved through the row of processing stations.

FIG. 6 shows in more detail an example of the design of the first station 22 which is determined for the infeed of fish frozen with raised fins. A positioning device comprises a lower part 38, 38' and an upper part 39 each of which is composed of two upright parallel plates 40 of synthetic material mounted in such a spaced relationship that there is a slot guide 41 between them, the width and depth of which are sufficient to receive the frozen fins in the slot. The slot guides 41 in the upper and lower part are positioned in the same vertical plane, thereby causing the vertical plane of symmetry of the fish to be positioned in this plane when the fish is inserted between the parts with the fins in engagement with the slot guides.

The upper part carries at its end facing towards the center of the roundtable a horizontally extending guide shaft or two guide pins 42 Journalled in a pair of vertically extending guide slits 43 provided in two upright plate members 44 stationarily fixed in relation to the frame 37 of the roundtable. The plates 40 of the upper part are fixedly mounted on a flange section having an upright flap 45 to which a pull rod 46 is pivotally secured at a distance from the guide shaft 42. The pull rod 46 may by means of a pneumatic cylinder 48 be activated to move in the direction of the arrows 47 so that the upper part may be lifted into an inactive position in which it gets clear of the lower part and a fish placed therein, and down into an active position in abutment on the lower part. In the active position of the upper part the pull rod 46 is unloaded, thereby allowing the upper part 39 to be freely pivoted in relation to the lower part or be displaced away from it by the upwards sliding movement of the pins 42 in slot guide 43.

The plates 40 of the lower part 38 are divided into two sections separated from each other, viz. an internal section 38 stationarily mounted in relation to the holder device 33 and an external section 38' which by means of a number of stiffeners 49 is stationarily mounted in relation to the frame 37. Due to said bipartition of the lower part, a fish may be positioned with the dorsal fins in engagement with the slot guide 41 in section 38' of the lower part during moving of section 38 of the lower part away from the cleaning station 32 to the infeed station 22. When section 38 has been rotated into position vis-`a-vis section 38' and the upper part 39 has been moved down into the active position in abutment on the lower part, the fish is pulled or pushed with the tail in front, in a manner not shown, in between the lower and upper part. In order to facilitate the insertion of the fins in the slot guides 41 these slot guides are in the radially outwards extending direction provided with wedge-shaped infeed openings 50, 51 and 52 guiding the fins into the slot guides 41. At the infeed end the underside of the upper part has a bevelled edge 53 sliding against the belly of the fish upon inserting the fish, thereby lifting the upper part as the fish penetrates between the parts. The infeed of the fish between the parts 38, 39 is stopped when the pectoral fins are on a level with the extreme end of the section 38 of the lower part. This may for instance be effected in that the pectoral fins hit two stops, not shown, stationarily mounted in relation to the section 38. When the fish has been inserted into this position, the holder device 33 is activated for fixing the fish, following which the upper part 39 is lifted into an inactive position and the ring 34 rotates the captured fish to the head cutter station.

In the embodiment illustrated in the drawings one internal lower part section 38 is disposed at each holder device 33. As the lower part is only used to position the fish, it is of course possible to design the roundtable with only a single section 38 which at the first station is mounted vertically displaceably between the active position shown in FIG. 6 and an inactive position in which section 38 is moved as much downwards as to get clear of the rotating part of the roundtable and does not any longer engage the fins of the fish retained in the holder device 33.

If the fish is not frozen with raised fins but instead with at least two plane, well defined areas on its exterior, the positioning may be effected by a device which by means of guide plates guides the fish into the desired position. If, for example, the fish is frozen in the mould illustrated in FIGS. 1 and 2, the positioning device may comprise two hexagonal rings arranged at either end of the holder device 33. The radially innermost ring may then have a shape corresponding to the section of the mould 1 marked by 54 in FIG. 2, while the radially outermost ring may have a shape as the mould section marked by 55. When the fish has been inserted in the rings it will be positioned with its vertical plane of symmetry in a vertical plane. After the holder device is activated to capture the fish the two guide rings are removed, e.g. in that each ring is formed in two parts that are moved away from each other.

It is obviously possible within the scope of the invention to design the mould 1 and the positioning device in many different correlative ways. For instance, the mould 1 may have a rhombic cross-section so that the fish during freezing is formed with a wedge-shape along the top side and the bottom side, and in this case the positioning device may consist of a lower part and an upper part substantially corresponding to the parts 38 and 39, except that the slot guides 41 have a wedge-shaped cross-section with a wedge angle corresponding to the acute angle between the rhomb-forming lateral faces of the freezing mould.

If the fish is frozen in a straight condition without further measures, i.e. neither with raised fins nor with plane areas that may serve as guide faces, it is still possible to position the fish in the desired position, but in this case a somewhat more complicated positioning device is required. In such a positioning device, not shown, a cutting-away is at first effected of at least two and preferably of all dorsal and ventral fins by means of a knife or a miller, see the fish in FIG. 10. The fish is then illuminated by a fluorescent light source making the fin rays in the fish meat to occur as a row of luminous dots 56 in the cut 57. Said dots may be detected by means of a video camera and from the positioning of the dots the vertical plane of symmetry of the fish may be determined in a computer, because the fin rays are positioned in the plane of symmetry. Subsequently, holder and guide means may turn the fish into the desired position and the holder device may be activated to retain the fish.

The holder device 33 includes a holder 58 provided on either side of the positioning device and having various, in casu four, fixing means 59 which, consecutively positioned in the longitudinal direction of the fish to be captured, are pivotally Journalled in two parallel supports 60 that are spaced apart and are secured to and supported between two pivot arms 61, 62, which are so pivotally Journalled in two upright flanges 63 rigidly connected with the ring 34 that the holder 58 may be pivoted from the position shown in FIG. 6 in which the holder abuts on the base 64 and a position in which the holder 58 is pivoted approximately 90° upwards so that the fixing means 59 are directed towards the side of the frozen fish inserted in the positioning means.

The pivoting of the holder 58 may for instance be effected in that a vertical rod (not shown) pivotally secured to the arm 61 is longitudinally displaced in the upwards or downwards extending direction by a driving means disposed beneath the holder.

As appears from FIG. 8, each fixing means is composed of an angular arm 65 which at its central, angular bending carries a pivot pin 66 inserted in bores in supports 60. The fixing means carries at its end facing towards the fish a pad 68 secured to a base 67 and made from a flexible, absorbent material of a porous synthetic material, such as nylon fiber material, foam rubber or polyurethane foam. It is also possible to make use of a piece of naturally available sponge. When the pad 68 after being wetted or moistened with liquid is brought into contact with the frozen fish body it conforms firstly to the peripheral shape of the body and then firmly freezes to the fish.

Experiments have shown that a pad of the dimensions 30×30×8 mm offers a retaining force of approximately 120N of tension perpendicular to the surface of the frozen fish. With this pad and similar pads of nylon fiber sponge and foam rubber which were loaded Until the retainment got damaged, it turned surprisingly out that the freeze connection between the fish and the pad did not burst but the bursting took place, however, in the pad proper which was torn across.

A torsion spring 69 whose one end is fastened to the arm 65 and whose other end is fastened to the support 60 urges the fixing means to move towards the fish body. It appears from FIG. 7, from which the upper support for the sake of clearness is removed, that the fixing means are capable of rotating inwards to abut on the fish, notwithstanding whether the exterior of the fish is at a varying distance from the supports 60. A pull rod 70 is positioned in guidances, not shown, on the one support 60 and extends past the outer end of arms 65. Next to each arm the pull rod has a projecting driving stud 71 which by the longitudinal displacement of the rod in the direction of the arrow 72 may be made to abut on the outer end of the arm 65 and by a further displacement of the rod the arms are pivoted in the direction of the arrow 73 in a direction away from the fish body until the fixing means occupy the retracted position shown in FIG. 6.

When the fish is to be fixed and the holder 58 has been swung into its upright position on a level with a fish body, a driving means 74 activates the rod for displacement in the opposite direction of the arrow 72, whereby the fixing means are released and swing into abutment on the fish body. The rod 70 is pushed still a distance forwards, whereby a conical enlargement 75 of the rod consisting of an elastic material is squeezed in under the outer end of each arm 65, thereby firmly locking the fixing means in position against the fish body.

It should further be observed that the pivot arm 61 is angularly bent and that the arm 62 is straight so that the supports 60 by and large extend parallel to the exterior of the fish when the holder device is swung up into engagement with the side of the whole fish. After the fish has been severed and the holder 58 has been pivoted to the position shown in FIG. 6, the further advantage is obtained by this design of the pivot arms 61, 62 that the upwards facing cut of the fish half will be mainly horizontal.

The processing of the fish will now be described in more detail. After the infeed, the orientation and the fixation of the fish in station 22 and the head cut-off in station 23 the holder device 33 with the captured complete fish body is routed to station 24 at which a saw 76 is mounted in a slide guide, not shown, which may move the saw in such a manner in the radial direction of the roundtable that the saw blade or the saw blades passes/pass into slot guide 41 in the lower part 38 of the holder device. The stationary part of the roundtable is provided with a recess 77 making space for the saw during the movement thereof from the inactive position located radially outside the roundtable, shown in solid lines in FIG. 5, to the radially innermost active position, shown in dot-and-dash lines, in which the saw blade has passed throughout the length of the slot.

As indicated in the drawings, the saw may comprise two vertically operating band saw blades each running over a respective set of superposed driving wheels 78. The two parallel, longitudinal cuts in the fish only have a slight width and the cuts may be so close to each other that a transversely outer segment of the neural spines is left in the frozen fish meat in either of the fish halves. In this manner only a small portion of the fish meat determined for consumption is removed and the spinous pegs of the backbone are simultaneously cut away.

The saw may alternatively be a circular saw the blade radius of which is larger than the height of the fish. In order to obtain a cut with a sufficient width for cutting away the spinous pegs the teeth of the circular saw may be set in lateral direction. The necessary cut width may also be obtained in that the blade of the circular saw is mounted on the driving shaft by means of wedge-shaped drunken-saw discs so that the plane of the blade is not completely perpendicular to the longitudinal direction of the driving shaft.

After the severing, the holder device 33 is rotated to station 25, in which the holders 58 are pivoted away from each other until the fish half fixed each holder is oriented with the cut face facing upwards.

Now the holder device 33 is moved to station 26 at which the cuts are searched to localize impurities in the fish meat. In order to facilitate the identification of the fish halves the fins in FIG. 5 are shown in dot-and-dash lines in spite of the fact that they were cut away from the fish halves by the splitting cut.

The cuts are scanned with a video camera to localize impurities in the fish meat. Impurities in the form of black membrane and the like may be detected as dark areas in the cut. In order to facilitate the localizing of bone remains the cut may be illuminated by a fluorescent light source making bone remains to brighten in comparison with the surrounding fish meat. The scanning localizes impurities in relation to the holder device 33 which has a well known positioning. The signals emitted by the scanning are transferred via wires 79 to a computer 80 which from the received information determines which of the impurities are to be removed.

When the fish halves are then moved to station 28 the computer operates as a control unit for cutting means which remove the unwanted impurities. The cutting means may for instance comprise a miller head 81 mounted on x-y guides 82 controlling the miller head in accordance with the control signals received from the computer 80. The miller heads 81 remove at least the residuals of the backbone such as the neural spine segments which by the severing of the fish may be left in the fish meat.

The stations 29 and 30 are structured in the same way as stations 26 and 28 and they serve to re-check the cleaning carried out in station 28. It is thus ensured that possible impurities that might be revealed by the cleaning in station 28 are found and removed from the fish meat.

The cleaned and re-checked fish halves are then routed to station 31 in which the downwards facing exterior of the fish halves is heated sufficiently to loosening the grasp of the fixing means 58 at the fish surface. The heating may for example be effected by means of vapour or radiation heat.

Figure 9:
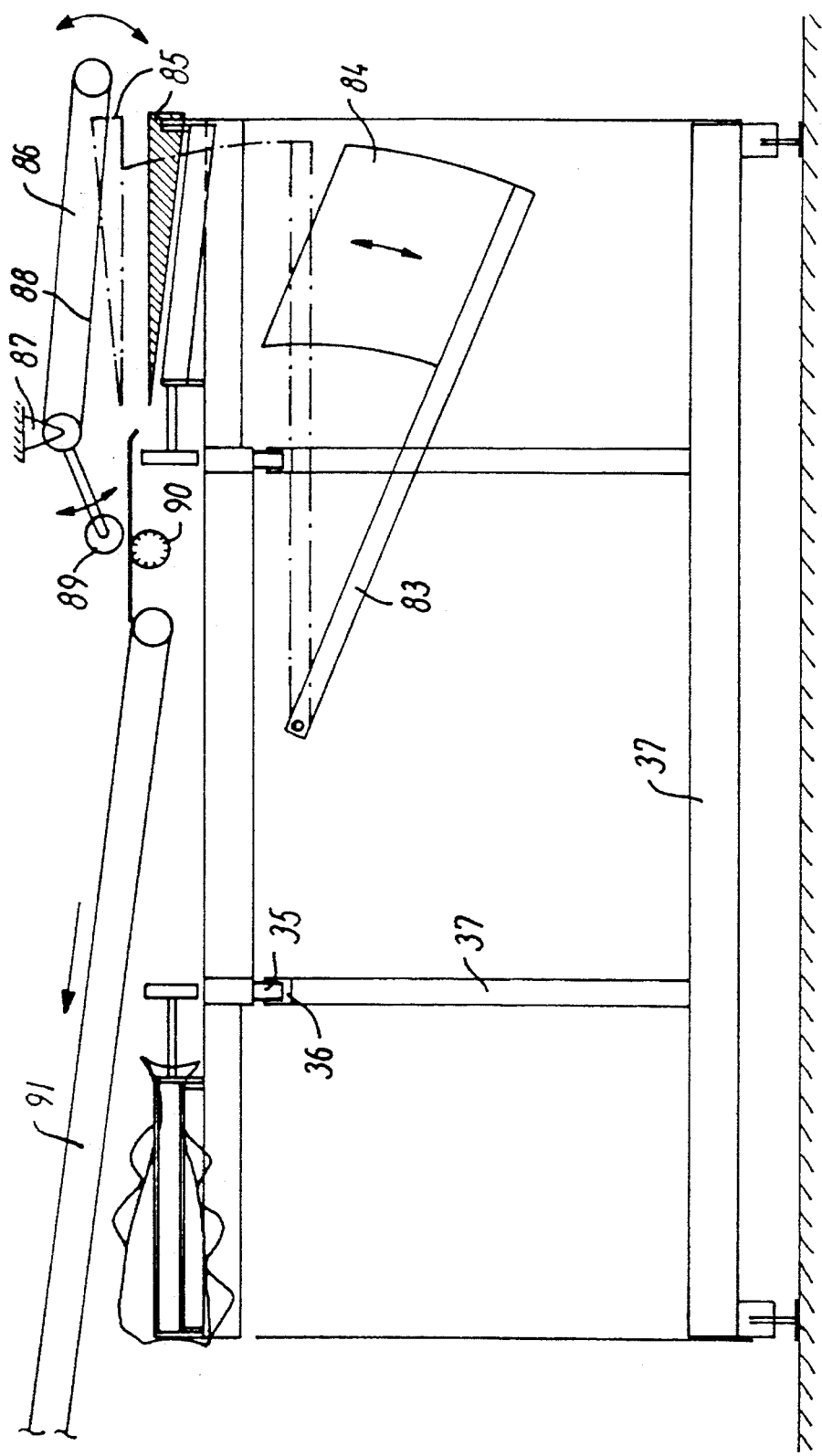

The fish halves are then lifted from the holder device 33 in that a pivot arm 83, positioned under the roundtable and which at its extreme end carries four rods 84 which extend in the radial direction of the table and are capable of passing upwards past the holders 58 and abut on the exterior of each fish half, is swung up into the position shown in dot-and-dash lines in FIG. 9, in which the rods 84 have lifted the fish halves clear of the holder device. In this position the fish halves abut on the underside of a conveyor 86 which at its one end is pivotally suspended in a holder 87 fixed in relation to the frame 37. When the fish halves abut on the conveyor whose lower-most conveyor belt run 88 is moved in the direction towards the center of the roundtable, the fish halves will be drawn in between a hold-down roller 89 pivotally journalled in holder 87 and a skinning means 90, e.g. of the type "Steen" manufactured by the Belgian company F.P.M. International N.V. After skinning the fish halves are disposed on a conveyor belt 91 passing the cleaned and skinned but still frozen fish halves on to a portioning and packaging station at which the fish pieces are packaged, possibly after being portioned and divided into special cuttings that may be of the type previously described. This cutting-up may for instance be effected in a known manner by means of water Jet cutting.

In station 32 the holders 58 are pivoted into the raised position and the driving means 74 is activated to swing the fixing means 59 into the inactive position by means of the pull rod 70 and the driving studs 71. Concurrently herewith the holder device is cleaned by flushing with hot water or by means of vapour spraying, thereby moistening the pads 68 so that they are ready to abut on the exterior of the following fish.

The computer 80 may be programmed to control the function of all active parts of the roundtable.

FIG. 11 illustrates a schematic diagram of an apparatus for faceted freezing of fish. The apparatus includes many mould units composed of an upper frame carrying a number of juxtaposed moulds of the aforementioned type.

At one end of the apparatus there is a mould unit 101 to be filled with fish, vis-`a-vis and on a lower level than a container 103 containing ventrally cleaned fish. As indicated by the arrows 113 a fish is, for example manually, filled into each mould 102 so that the tail end of the fish faces downwards and its exterior becomes deformed by the mould in the above mentioned manner. The filled mould unit is moved in the direction of the arrow 114 under the container 103 and on to a lifting unit 104 which seizes the mould unit and lifts it above and by the end wall of a vessel 105, following which the lifting unit 104 submerges the mould unit into the vessel, as illustrated by the arrows 115, for delivering it on to a conveyor movable in the longitudinal direction of the vessel and which advances the mould unit through the vessel 105, as shown by the arrow 116. The vessel contains coolant, such as NaCl-brine at a temperature of approximately −18° C. and a freezing of the outer layer of the fish will therefore be effected in the vessel. The advancing rate through the vessel is set so that the fish is frozen to a depth ensuring that the fish preserves its frozen shape, even when removed from the mould 102. At the outlet end of the vessel the mould unit is seized by a transfer unit 106 lifting the mould unit from the vessel (shown by the arrow 117) and displacing it laterally (shown by the arrow 118) for delivery into a reversing device 107 which extends parallel to the vessel 105 and returns the mould unit (arrow 119) to a position opposite the lifting unit 104 simultaneously with turning the mould unit 101 upside down so that the inlet opening of each mould faces downwards. The mould unit 101 is now in an emptying station 108 at which the moulds are heated by means of heat radiation or by hot water flushing so that the fish slips the mould and drops down on to a conveyor 110 which over part of its length is placed in a cooling vessel 111 and extends parallel to the reversing device 107. The cooling vessel 111 is also filled with coolant, such a brine, and the conveyor 110 passes the fish submerged in the coolant through the cooling vessel 111 to be picked up and delivered at the end of the vessel, as shown by arrow 122. The fish is frozen in the cooling vessel 111 to such a degree that it may afterwards be stored straightaway in a cold storage.

A tilting device 109 ensures that the emptied mould unit is inverted and delivered vis-`a-vis the end of the vessel 111 in a transfer unit 112 displacing the mould unit laterally to be positioned vis-`a-vis the container 103 for refilling the moulds.

The apparatus is distinguished by being extremely compact and simple to operate so that only a small number of workers are required to freeze a large quantity of fish in such a shape that in the following processing in land the fish may be positioned as described above.

We claim:

1. A method of processing roundfish, which have an individual weight as caught from 0.3 to 10 kilos and each has a body with a vertebral column (Columna Vertebralis) and a vertical plane of symmetry, into portion packed frozen pieces of fish meat, which roundfish after catch and ventral cleaning have been frozen onboard a fishing boat and been transported to factory in frozen condition, comprising the steps of:

positioning said roundfish with positioning means that allow the frozen fish body to be positioned with its vertical plane of symmetry aligned with a cutting means, cutting said roundfish in said frozen condition while being held in said aligned position by fixing means in at least two frozen pieces by at least one longitudinal splitting cut following said vertical plane of symmetry of said frozen fish body, so that at least the main portion of said vertebral column is removed from said frozen fish meat by said cut, searching said frozen pieces for possible bone remains and other unwanted impurities which subsequently, at least in part are removed from said frozen fish meat, and packing said frozen pieces as portions and then being freeze stored.

2. A method as claimed in claim 1, wherein said vertebral column includes spinous pegs and vertebra segments, said longitudinal splitting cut is effected so that said spinous pegs are cut away from the fish meat but transversely outer segments of said vertebra segments are left as bone remains in said frozen fish meat, and said bone remains are localized in the frozen fish meat and removed therefrom.

3. A method as claimed in claim 1, wherein said positioning means are at least two plane areas freeze shaped and placed on the exteriors of the fish and extending along a substantial part of the length of the fish.

4. A method as claimed in claim 3, wherein said two plane areas are positioned opposite each other on either side of said fish body.

5. A method as claimed in claim 3, wherein said two plane areas are provided on said fish body by placing the freshly caught and ventrally cleaned fish body in a mould, which holds said body in mainly straight shape with said two plane areas on the exterior of said body, and by keeping said body in said mould until at least an outer layer of said body is frozen.

6. A method as claimed in claim 1, wherein said positioning means are provided by raising at least two fins on said fish body and by freezing said raised fins.

7. A method as claimed in claim 6, wherein said raised, frozen fins are provided on said fish body by suspending said caught and ventrally cleaned fish body at its tail, by raising said fins and flushing said fish body with coolant until said raised fins and at least an outer layer of said fish body are frozen, and by subjecting said fish body to further freezing while maintaining the shape obtained during said suspending.

8. A method as claimed in claim 6, wherein said frozen fish body is aligned with said cutting means by inserting said frozen, raised fins into slots in guides arranged at said cutting means.

9. A method as claimed in claim 1, wherein said positioning means are provided by cutting away at least two fins of said fish body, so that the fin rays in the fish meat occur in the cut, and said frozen fish body is aligned with said cutting means by detecting the positions of said fin rays, by determining said vertical plane of symmetry form said positions of said fin rays, and by placing said vertical plane in alignment with said cutting means.

10. A method as claimed in claim 1, herein said roundfish are individually frozen onboard said fishing boat in mainly straight shape.

11. A method as claimed in claim 1, wherein said fixing means are frozen onto the exterior of said frozen fish body.

12. A method as claimed in claim 11, wherein said fixing means are wetted and subsequently brought into contact with the exterior of said frozen fish body and fixed to the latter by freezing.

13. A method as claimed in claim 12, wherein said fixing means freeze-bonded to the exterior of said frozen fish body are the sole fixing means in contact with said fish body during splitting of said body by said longitudinal splitting cut.

14. A method as claimed in claim 1, wherein both said search for possible bone remains and other unwanted impurities in said frozen pieces and said removal of said unwanted impurities from said fish meat are effected automatically.

15. A fish processing apparatus for roundfish which have an individual weight as caught from 0.3 to 10 kilos and each has a body with a vertebral column (Columna Vertebralis) and a vertical plane of symmetry, which roundfish after catch and ventral cleaning have been frozen onboard a fishing boat and been transported to factory in frozen condition, wherein said apparatus comprises a plurality of consecutive stations, including (a) a first station for infeed of the frozen fish, at which said fish body is positioned with its vertical plane of symmetry in a predetermined position with respect to a holder device having fixing means, and at which said frozen fish body is held by said fixing means, said holder device being movable as a unit through said consecutive stations, (b) a second station at which said vertical plane of symmetry is positioned in parallel with a cutting direction of a cutting device, and at which said cutting device effects at least one cut longitudinally through said frozen fish body mainly in parallel with said vertical plane, thereby cutting away th major portion of said vertebral column and splitting said frozen body in two halves, (c) a third station at which said two fish halves are turned with the cuts facing upward, (d) a fourth station at which a detector, having a video camera, localizes impurities in the fish meat and records their positioning, (e) a fifth station at which unwanted impurities are removed by means of a tool, the movement of which is controlled by a control unit which from the detector has received information about the positioning of the recorded impurities, (f) a sixth station at which said cleaned fish halves are released from said holder device, and (g) a seventh station at which said holder device is cleaned and prepared for receiving a new, frozen fish body.

16. A fish processing apparatus as claimed in claim 15, wherein said first station includes a positioning device for frozen fish bodies with raised, frozen fins having a certain height, which device has a lower part and an upper part each with a longitudinal slot guide positioned opposite each other, said slot guides having a length at least of the same size as said frozen fish body and a depth larger than said height of said raised fins, said upper part being movable in relation to said lower part in such a manner that said slot guides in said two parts remain substantially in a common plane.

17. A fish processing apparatus as claimed in claim 16, wherein said lower part and said slot therein are considerably longer than said upper part, each of said slot guides in said lower and upper parts continues into a wedge-shaped infeed opening at one end of said slot guide, and said underside of said upper part is bevelled at said one end of said slot guide.

18. A fish processing apparatus as claimed in claim 15, wherein said fixing means of said holder device are lockable in abutment on the exterior of said frozen fish body, and said fixing means each include a fluid absorbing and flexible material determined to abut said exterior of said frozen fish body.

19. A fish processing apparatus as claimed in claim 18, wherein said fluid absorbing and flexible material is of a porous synthetic material selected from a group including nylon fiber material, foam rubber and polyurethane foam.

20. A fish processing apparatus as claimed in claim 18, wherein said holder device has two holders each carrying a number of fixing means distributed over a length corresponding to the length of said frozen fish body, which holders are situated on either side of a fish positioning device and are mounted swingable between a position in which said flexible material can abut the sides of a frozen fish disposed in said positioning device, and a position in which the surface of said flexible material determined to abut the fish body faces upwards.

21. A fish processing apparatus as claimed in claim 20, wherein said holders are swingable through an angle of 90°.

22. A fish holding mould for freeze-shaping roundish which have an individual weight as caught from 0.3 to 10 kilos and each has a body with a vertebral column (Columna Vertebralis) and a vertical plane of symmetry, which roundfish after catch and ventral cleaning onboard the fishing boat is placed in and shaped by said mould and frozen, wherein said mould has at least two planar longitudinal lateral faces of a length corresponding to a substantial part of the length of said fish body, said faces each having two ends and a width which decreases from their one end to the other, said faces having a mutual positioning so that an internal clearance of said mould in a direction transversely to said planar lateral faces is smaller than the anatomical width in the same direction of said fish inserted in said mould.

* * * * *